३,४४४,०९९
EQUILIBRATION AND STEAM-
REFORMING CATALYSTS
William F. Taylor, Scotch Plains, and John H. Sinfelt,
Berkeley Heights, N.J., assignors to Esso Research and
Engineering Company, a corporation of Delaware
No Drawing. Filed Dec. 23, 1965, Ser. No. 516,090
Int. Cl. B01j 11/06
U.S. Cl. 252—465                                      8 Claims

ABSTRACT OF THE DISCLOSURE

Catalysts for gas equilibration reactions having high resistance to poisoning are prepared from oxides of nickel, aluminum, zinc or copper, and chromium with a basic metal oxide promoter. The catalysts are especially useful in reactions involving hydrocarbons, carbon oxides, and steam where sulfur impurities are present.

---

This invention relates to sulfur-resistant equilibration catalyst useful for catalyzing steam-hydrocarbon reforming and reactions for removal of pollutants from fuel combustion products, e.g., auto exhaust gases. The catalysts are termed equilibration catalysts because the product distribution attained is largely determined by the equilibria involved in certain reactions such as the water gas shift and methanation reactions.

The sulfur-resistant catalysts of this invention are prepared by coprecipitating nickel, aluminum, copper or zinc and chromium as hydroxides, carbonates, or basic carbonates, which on calcination in the presence of oxygen or air form mixed oxides. Before the calcination, the coprecipitated metal hydroxides, carbonates or basic carbonates are impregnated with a barium salt that is decomposed to barium oxide by the calcination. The resulting catalyst, in which the mixed oxides are interspersed, is treated with hydrogen before use to reduce all or part of the nickel oxide present to nickel metal. The hydrogen treatment or preactivation may also change the oxidation state of other metals present; e.g., it may reduce all or part of the cupric oxide to cuprous oxide or metallic copper. However, the compositions are expressed in terms of the higher oxides.

In the coprecipitation of the metal hydroxides, carbonates or basic carbonates, the metal compounds formed are interspersed. Hydroxides, carbonates, or basic carbonates of certain other metals, particularly of iron, cobalt, molybdenum, and tungsten may be coprecipitated also with the hydroxides, carbonates or basic carbonates of Ni, Al, Cu, Zn, and Cr to obtain more activity. Other basic metal oxide type promoters may be used instead of barium; e.g., potassium, cesium, strontium, lanthanum and cerium.

In the finished and activated form, the catalysts as granules, pills, pellets or other formed shapes contain elementary nickel interspersed with mixed oxides derived from the coprecipitated metal compounds. The catalyst is made to contain 18 to 35 wt. percent NiO before pretreatment with hydrogen.

Reactions to be catalyzed are represented as follows:

(1)   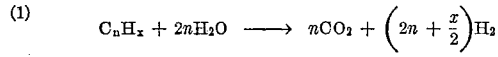

(2)   $CO + H_2O \rightarrow CO_2 + H_2$ (3)   $CO + 3H_2 \rightarrow CH_4 + H_2O$ In these reactions, $n$ can have a value from 1 to 12 and $x$ can have a value from $n$ to $(2n+2)$. Thus,

In the first reaction, the hydrocarbon molecules undergo steam reforming to produce hydrogen and carbon oxides. In the second reaction, carbon monoxide undergoes the so called "water gas shift" reaction with $H_2O$ to form $CO_2$ and $H_2$. In the third reaction, carbon monoxide reacts with hydrogen in the so called "methanation" reaction to form $CH_4$ and $H_2O$. Other reactions are indicated to occur, e.g., reduction of nitrogen oxides. These reactions may occur concurrently or consecutively depending on the composition of reactant gases to which the catalyst is exposed.

The operating conditions determine the principal products. For example, when reacting a hydrocarbon with steam, $H_2$ is the principal product at low pressure, high temperature, and high space velocities. At lower space velocities, higher pressures and lower temperatures, the yield of $CH_4$ increases. The amount of conversion of the hydrocarbons and of CO increases with the activity of the catalyst which in turn depends on resistance to poisoning of the catalyst.

Catalyst preparations and tests are illustrated in the following examples:

Example 1.—29 $NiO$/10 $CuO$/10 $Cr_2O_3$/46 $Al_2O_3$/5 $BaO$

To prepare this catalyst, into 3 liters of deionized water are dissolved 310 g. $Ni(NO_3)_2 \cdot 6H_2O$, 940 g.

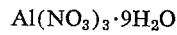

138 g. $Cr(NO_3)_3 \cdot 9H_2O$, and 84 g. $Cu(NO_3)_2 \cdot 3H_2O$; the temperature of the solution is raised to 140° F. with stirring; 1150 g. $NH_4HCO_3$ is added during a 1 to 2 hour period to the solution, which is then maintained for an additional 30 minutes at 125° to 140° F. while stirring the slurry of precipitated compounds (carbonates, basic carbonates, or hydroxides); the slurry is then filtered; 23.6 g. $Ba(NO_3)_2$ is dissolved in deionized water, admixed with the precipitated solids to make a paste, dried at 230° F., calcined in air for 4 hours at 900° F., pilled and then treated with a stream of $H_2$ for 4 hours at 900 to 1000° F. The pills or extruded pellets are $\frac{1}{16}$ to $\frac{1}{4}$ inch in diameter.

The nitrate salts are used because they decompose to oxides on calcination. Use of the $NH_4HCO_3$ precipitating agent, which results in $NH_3$ liberation during calcination, does not lead to formation of additional metal oxides. Similarly other compounds of the metals can be used if they do not prevent formation of the desired metal oxide composition, e.g., molybdic acid instead of the nitrate.

Example 2.—24 $NiO$/18 $Fe_2O_3$/8 $CuO$/8 $Cr_2O_3$/38 $Al_2O_3$/4 $BaO$

This catalyst is prepared in the same manner as the catalyst of Example 1 is prepared but with addition of 216 g. $Fe(NO_3)_3 \cdot 9H_2O$ to the solution from which the hydroxides, carbonates, or basic carbonates are precipitated.

Similarly, the other promoters such as CoO, $MoO_3$, $WO_3$, and mixtures of these oxides are incorporated by addition of compounds such as cobalt nitrate, molybdic acid, and tungstic acid to the solution from which the hydroxides, carbonates, or basic carbonates are precipitated.

In general, the NiO and oxide promoters in the calcined catalyst are preferably present in the proportions: 18 to 35 NiO, 12 to 61 $Al_2O_3$, 5 to 15 CuO, 5 to 15 ZnO, 5 to 15 $Cr_2O_3$, 1 to 15 BaO, and 5 to 25 of the other oxides in parts by weight. The oxides other than NiO, $Al_2O_3$, CuO, ZnO, and $Cr_2O_3$ can be present singularly or in combination of two or more.

The activities of the catalysts were evaluated by standard accelerated tests in terms of percent conversion of indicated components of an exhaust gas blend treated at 900° F. and a space velocity of 10,000 vol. of gas/vol. of catalyst/hr. The gas blend treated was a blend of 70.5% $N_2$, 14% $H_2O$, 10.5% $CO_2$, 3% CO, 1.2% $H_2$, 0.6% $O_2$, 600 p.p.m. n-$C_4H_{10}$, 600 p.p.m. $C_4H_8$, and 0.12% NO with 500 p.p.m. $SO_2$ added continuously after $SO_2$-free gas blend was used for testing initial activity. The catalysts were activated by treatment with hydrogen prior to the tests.

Comparative tests were made with catalysts formed similarly but without the preferred promoters.

Results of the activity tests are summarized in the following table:

per hour, at temperatures in the range of 300° to 1600° F., and under pressures of 0 to 500 p.s.i.a.

The invention described is claimed as follows:

1. A sulfur-resistant catalyst for steam-hydrocarbon reforming and equilibration of the reactions of hydrocarbons and CO with $H_2O$ prepared by hydrogen activation of a calcined interspersed mixture comprising, prior to hydrogen activation, in parts by weight, 18 to 35 parts NiO, 12 to 61 parts $Al_2O_3$, 5 to 15 parts $Cr_2O_3$, 5 to 15 parts of CuO, and 1–15 parts BaO promoter; said interspersed Ni, Al, Cr and Cu components having been impregnated with a Ba compound which decomposes to BaO by calcination.

2. The catalyst defined in claim 1 additionally con-

TABLE I.—TEST DATA ON ACTIVITIES OF CATALYSTS WITH VARIED PROMOTERS

| Catalyst | Activity [1] | | | | | | Wt. percent sulfur on dumped catalyst |
|---|---|---|---|---|---|---|---|
| | Initially (SO₂ free) | | | After 3 hours with 500 p.p.m. SO₂ | | | |
| | nC4 | C4= | CO | nC4 | C4= | CO | |
| 11 NiO/79 Al₂O₃/10 BaO (A) | 68 | 90 | 73 | 0 | 0 | 8 | 1.56 |
| 27 NiO/63 Al₂O₃/10 BaO (B) | 84 | 95 | 73 | 18 | 17 | 32 | 1.81 |
| 63 NiO/34 Al₂O₃/3 BaO (C) | 100 | 100 | 73 | 0 | 0 | 0 | 4.83 |
| 16 NiO/11 ZnO/11 Cr₂O₃/51 Al₂O₃/11 BaO (D) | 77 | 97 | 69 | 0 | 30 | 0 | |
| 29 NiO/10 CuO/10 Cr₂O₃/46 Al₂O₃/5 BaO (E) | 90 | 100 | | 32 | 48 | | 2.71 |
| 29 NiO/10 ZnO/10 Cr₂O₃/46 Al₂O₃/5 BaO (F) | 92 | 100 | 71 | 29 | 35 | 45 | 1.72 |
| 38 NiO/8 ZnO/8 Cr₂O₃/41 Al₂O₃/5 BaO (G) | 89 | 100 | | 3 | 14 | | |
| 25 NiO/12 CoO/8 CuO/8 Cr₂O₃/43 Al₂O₃/4 BaO (H) | 94 | 100 | 61 | 28 | 68 | 52 | 4.22 |
| 25 NiO/12 MoO₃/8 CuO/8 Cr₂O₃/43 Al₂O₃/4 BaO (I) | 75 | 98 | 66 | 10 | 55 | 44 | 3.71 |
| 24 NiO/18 Fe₂O₃/8 CuO/8 Cr₂O₃/38 Al₂O₃/4 BaO (J) | 81 | 97 | 60 | 31 | 62 | 59 | 3.99 |
| 25 NiO/7 CoO/7 MoO₃/8 CuO/8 Cr₂O₃/41 Al₂O₃/4 BaO (K) | 92 | 100 | 62 | 36 | 60 | 50 | 3.90 |
| 25 NiO/12 WO₃/8 CuO/8 Cr₂O₃/43 Al₂O₃/4 BaO (L) | 69 | 92 | 48 | 33 | 76 | 28 | 3.37 |
| 25 NiO/7 CoO/7 Fe₂O₃/8 CuO/8 Cr₂O₃/41 Al₂O₃/4 BaO (M) | 89 | 100 | 64 | 19 | 61 | 56 | 4.25 |

[1] Activity as percent converison of indicated compound in standard catalyst test: 900° F., 10,000 v./v./hr. of simulated auto exhaust gas blend (70.5% N₂, 14% H₂O, 10.5% CO₂, 3% CO, 1.2% H₂, 0.6% O₂, 600 p.p.m. nC₄, 600 p.p.m. C₄=, 0.12% nitric oxide) with 500 p.p.m. SO₂ added continuously after initial activity is measured on SO₂ free gas blend. Catalysts pre-reduced with H₂ at 1,000° F.

The activity screening tests definitely show that a beneficial improvement in the conversion of the hydrocarbons and CO in the presence of poisons is obtained with the selected metal oxide promoters present. The activity was remarkably maintained by the best catalysts in the presence of the added $SO_2$.

These data show that the amount of Ni present in the catalyst is an important factor for poison-resistance. A comparison of catalyst B versus A and C, and catalysts E and F versus D and G shows that 18 to 35% NiO present in the catalyst is desired for improved sulfur resistance. Not all of the nickel oxide need be reduced but generally most of it is.

More extended tests proved that the particular metal oxide catalysts which performed well in the short, severe screening test, also performed well when exposed to auto exhaust gas produced from an engine runing on fuels containing thiophene S, tetraethyl lead, and organo-halide scavengers. For example, the catalyst 24 NiO/18 $Fe_2O_3$/8 CuO/8 $Cr_2O_3$/38 $Al_2O_3$/4 BaO during an extended run of more than 20 hours gave average conversions of 58% for hydrocarbons and 64% for CO.

The sulfur-resistant catalysts described are not deactivated by small amounts of oxygen normally present in the gaseous fuel combustion products and air need not be added. The gases treated may be passed over the catalyst under widely varying conditions, e.g., space velocities of 1000 to 20,000 (S.T.P.) volumes per volume of catalyst taining, prior to hydrogen activation, 5–25 parts by weight of an interspersed oxide promoter from the group consisting of Fe, Co, Mo, W, and mixtures thereof.

3. The catalyst of claim 2 wherein said interspersed oxide promoter is CoO.

4. The catalyst of claim 2 wherein said interspersed oxide promoter is $MoO_3$.

5. The catalyst of claim 2 wherein said interspersed oxide promoter is $Fe_2O_3$.

6. The catalyst of claim 2 wherein said interspersed oxide promoter is $WO_3$.

7. The catalyst of claim 2 wherein said interspersed oxide promoter includes CoO and $Fe_2O_3$.

8. The catalyst of claim 2 wherein said interspersed oxide promoter includes CoO, and $MoO_3$.

References Cited

UNITED STATES PATENTS

| 3,141,729 | 7/1964 | Clarke et al. | 252—468 |
| 3,179,488 | 4/1965 | Appell | 23—2.2 |
| 3,271,324 | 9/1966 | Stephens et al. | 252—466 |
| 3,317,439 | 5/1967 | Stiles | 252—466 |
| 3,337,646 | 8/1967 | Khoobiar | 252—455 |

DANIEL E. WYMAN, *Primary Examiner.*

P. E. KONOPKA, *Assistant Examiner.*

U.S. Cl. X.R.

23—2.2, 212; 48—197, 214; 252—466